(12) United States Patent
Bieszczad et al.

(10) Patent No.: US 8,944,112 B2
(45) Date of Patent: Feb. 3, 2015

(54) BRAIDED HOSE AND METHOD OF MAKING SAME

(75) Inventors: Paul A. Bieszczad, Perrysburg, OH (US); James P. Barnhouse, Perrysburg, OH (US); Daniel P. Mace, Jr., Gassville, AR (US); Gregory A. Haunhorst, Maumee, OH (US); Dennis J. Rogers, Mountain Home, AR (US)

(73) Assignee: Eaton Corporation, Cleveland, OH (US)

( * ) Notice: Subject to any disclaimer, the term of this patent is extended or adjusted under 35 U.S.C. 154(b) by 2442 days.

(21) Appl. No.: 11/670,263

(22) Filed: Feb. 1, 2007

(65) Prior Publication Data

US 2008/0185063 A1    Aug. 7, 2008

(51) Int. Cl.
*F16L 11/12* (2006.01)
*F16L 11/08* (2006.01)
*F16L 11/04* (2006.01)

(52) U.S. Cl.
CPC ............... *F16L 11/085* (2013.01); *F16L 11/12* (2013.01); *F16L 2011/047* (2013.01)
USPC ............................ 138/127; 138/126; 138/137

(58) Field of Classification Search
USPC ......................................... 138/126, 127, 137
See application file for complete search history.

(56) References Cited

U.S. PATENT DOCUMENTS

| | | | | |
|---|---|---|---|---|
| 2,899,982 A | * | 8/1959 | Harpfer | 138/137 |
| 3,462,177 A | * | 8/1969 | Skinner et al. | 285/222.2 |
| 3,604,461 A | * | 9/1971 | Matthews | 138/137 |
| 3,791,415 A | * | 2/1974 | Lawless et al. | 138/127 |
| 4,142,554 A | | 3/1979 | Washkewicz et al. | |
| 4,192,351 A | | 3/1980 | Henry | |
| 4,196,464 A | | 4/1980 | Russell | |
| 4,261,390 A | | 4/1981 | Belofsky | |
| 4,262,704 A | * | 4/1981 | Grawey | 138/130 |
| 4,273,160 A | | 6/1981 | Lowles | |
| 4,343,333 A | | 8/1982 | Keister | |
| 4,384,595 A | | 5/1983 | Washkewicz et al. | |
| 4,488,577 A | * | 12/1984 | Shilad et al. | 138/127 |
| 4,510,974 A | * | 4/1985 | Natori et al. | 138/137 |
| 4,802,938 A | * | 2/1989 | Kitami et al. | 156/149 |
| 4,898,212 A | | 2/1990 | Searfoss et al. | |
| 4,952,262 A | | 8/1990 | Washkewicz et al. | |
| 5,024,419 A | * | 6/1991 | Mulvey | 251/148 |
| 5,052,444 A | * | 10/1991 | Messerly et al. | 138/125 |
| 5,084,314 A | * | 1/1992 | Igarashi et al. | 428/36.2 |

(Continued)

*Primary Examiner* — James Hook
(74) *Attorney, Agent, or Firm* — Squire Patton Boggs (US) LLP

(57) ABSTRACT

A hose including at least one rubber layer, an outer cover, and at least one barrier layer provided between the rubber layer and the outer cover, wherein the barrier layer is configured to prevent rubber from the rubber layer from reaching the outer cover during curing of the hose. In one embodiment, the rubber layer is the hose inner tube and the outer cover is braided wire. In another embodiment, the barrier layer includes at least one layer of polymeric film. In another embodiment, the hose can include at least one reinforcing layer provided between the rubber layer and the barrier layer. In another embodiment, the hose can include at least one intermediate layer provided between the rubber layer and the barrier layer, where the intermediate layer is formed from a porous material. In another embodiment, the hose can include at least one retaining layer provided between the barrier layer and the outer cover, where the retaining layer is formed from a polymeric material. Optionally, a composite barrier/retaining layer can replace the separate barrier and retaining layers.

25 Claims, 4 Drawing Sheets

(56) References Cited

U.S. PATENT DOCUMENTS

| | | | |
|---|---|---|---|
| 5,183,079 A * | 2/1993 | Blin | 138/110 |
| 5,460,247 A | 10/1995 | Fouts | |
| 5,588,469 A * | 12/1996 | Kakiuchi et al. | 138/137 |
| 6,109,306 A | 8/2000 | Kleinert | |
| 6,237,641 B1 * | 5/2001 | Niki et al. | 138/126 |
| 6,341,625 B1 | 1/2002 | Maruyama et al. | |
| 6,390,141 B1 | 5/2002 | Fisher et al. | |
| 6,742,545 B2 | 6/2004 | Fisher et al. | |
| 6,926,038 B1 | 8/2005 | Cook et al. | |
| 2004/0022979 A1 | 2/2004 | Ludwig et al. | |
| 2004/0040609 A1 * | 3/2004 | Oishi et al. | 138/141 |
| 2005/0211325 A1 * | 9/2005 | Takagi et al. | 138/121 |

* cited by examiner

BRAIDED HOSE AND METHOD OF MAKING SAME

BACKGROUND

1. Field of the Invention

The present application relates to a hose for conveying fluid and, more particularly, to a braided hose that is configured to reduce or prevent rubber from protruding through gaps in the outer braid.

2. Description of the Related Art

High performance hose with a braided stainless steel wire cover is used in racing and show car applications where a shinny and bright appearance is demanded. This type of hose has typically been made on rigid mandrels. This manufacturing method requires excessive floor space, is more labor intensive and costly, and limits the continuous length of hose that can be produced.

Therefore, there are many advantages to building this type of hose on a flexible mandrel that allows coiling up to 5000 feet of hose on a reel. However, simply transferring the production of the hose from a rigid mandrel to a flexible mandrel oftentimes results in rubber from the hose protruding through the gaps in the braided wire cover (also known as rubber "strike through"). This is due to the fact that, during curing of the hose, the flexible mandrel expands much more than the rigid mandrel. This increase in expansion forces excess rubber from the hose out through the gaps in the braided wire cover showing up as small black spots on the outside of the hose. This results in unacceptable appearance to the customer.

SUMMARY

A hose including at least one rubber layer, an outer cover, and at least one barrier layer provided between the rubber layer and the outer cover, wherein the barrier layer is configured to prevent rubber from the rubber layer from reaching the outer cover during curing of the hose. In one embodiment, the rubber layer is the hose inner tube and the outer cover is braided wire. In another embodiment, the barrier layer includes at least one layer of polymeric film. In another embodiment, the hose can include at least one reinforcing layer provided between the rubber layer and the barrier layer. In another embodiment, the hose can include at least one intermediate layer provided between the rubber layer and the barrier layer, where the intermediate layer is formed from a porous material. In another embodiment, the hose can include at least one retaining layer provided between the barrier layer and the outer cover, where the retaining layer is formed from a polymeric material. Optionally, a composite barrier/retaining layer can replace the separate barrier and retaining layers.

BRIEF DESCRIPTION OF THE DRAWINGS

It will be appreciated that the illustrated boundaries of elements in the figures represent one example of the boundaries. One of ordinary skill in the art will appreciate that one element may be designed as multiple elements or that multiple elements may be designed as one element. An element shown as an internal component of another element may be implemented as an external component and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Figure 1:
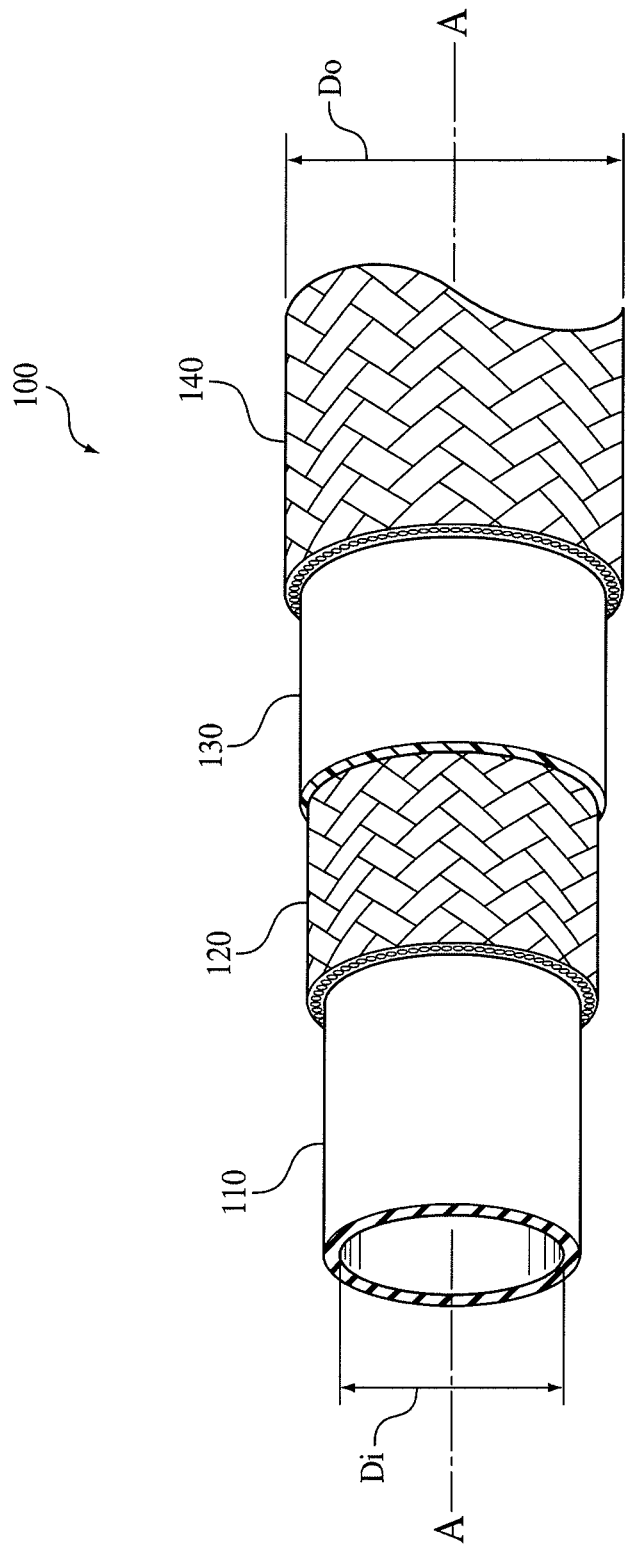
FIG. 1 illustrates a perspective view, partly cut away, of one embodiment of a hose 100.

Certain terminology will be used in the foregoing description for convenience in reference only and will not be limiting. For example, the terms "forward," "rearward," "right," "left," "upper," and "lower" designate directions in the drawings to which reference is made, with the terms "inward," "interior," or "inner" and "outward," "exterior," or "outer" referring, respectively, to directions toward and away from the center of the referenced element, and the terms "radial" and "axial" referring, respectively, to directions perpendicular and parallel to the central longitudinal axis of the referenced element.

Illustrated in FIG. 1 is a perspective view, partly cut away, of one embodiment of a hose 100 for conveying a fluid, such as air, hydraulic oil, lubricating oil or fuel. As shown in FIG. 1, the hose 100 is a multi-layer structure that includes a rubber layer 110, a reinforcing layer 120 surrounding the rubber layer 110, a barrier layer 130 surrounding the reinforcing layer 120, and an outer cover 140 surrounding the barrier layer 130. Each of these layers will be discussed in more detail below.

In basic dimensions, the hose 100 extends axially to a predetermined length along a central longitudinal axis A, and has an inner diameter $D_i$ and outer diameter $D_o$. The dimensions of the inner diameter $D_i$ and the outer diameter $D_o$ can vary depending upon the particular fluid conveying application involved.

In the illustrated embodiment, the rubber layer 110 is an inner tube through which fluid passes ("hereinafter referred to as "inner tube 110") that includes an inner surface, which defines the inner diameter $D_i$, and an outer surface, which defines a wall thickness therebetween. As with the overall dimensions of the hose 100, the wall thickness of the inner tube 110 may vary depending upon the particular fluid conveying application involved. It will be appreciated that the hose 100 can include additional rubber layers between the inner tube 110 and the barrier layer 130.

As shown in FIG. 1, the inner tube 110 has a unitary, single-layer construction and, as discussed above, is constructed of rubber. Alternatively, the inner tube 110 has a unitary, single-layer construction that can be constructed of other polymeric compositions. In an alternative embodiment (not shown), the inner tube 110 may be formed of a composite, multi-layer construction that includes an innermost layer or liner, which defines the inner core tube surface, and an outermost layer, which defines the outer core tube surface. Optionally, an intermediate layer may be provided between the inner most and outer most layers if these two layers are formed of chemically dissimilar or otherwise incompatible materials.

In the illustrated embodiment, the reinforcement layer 120 includes a braided reinforcement material. Alternatively, the reinforcement layer 120 can include a spirally wound, knitted, or wrapped reinforcement material. The reinforcement layer 120 is employed in the hose 100 to resist collapsing of the inner tube 110, especially when the hose 110 is used in vacuum applications. Additionally, the reinforcement layer 120 may include a single ply or multiple plies of reinforcement materials and may fully cover the inner tube 110 (e.g., 100% coverage as shown in FIG. 1) or partially cover the inner tube 110 (e.g., 50% coverage). It will be appreciated that in certain applications, the hose 100 may not include the reinforcement layer 120 (e.g., when the hose 100 is exclusively used in pressurized applications).

The reinforcement material can include, for example, a metal wire made from carbon steel, stainless steel, galvanized steel, zinc plated steel, brass, steel alloys, and blends thereof. Alternatively, the reinforcement material can include natural fibers and textiles, synthetic fibers and textiles, or other reinforcement materials typically found in hose constructions.

In the illustrated embodiment, the outer cover 140 includes a braided reinforcement material such as stainless steel wire. The braided stainless steel wire outer cover assists in keeping the cross-section of the inner tube 110 round as well as providing an aesthetically pleasing appearance. In an alternative embodiment (not shown), the reinforcement material can be knitted. In other embodiments, the reinforcement material can include metal wire made from carbon steel, galvanized steel, zinc plated steel, brass, steel alloys, and blends thereof, or can include natural or synthetic fibers. Moreover, the outer cover 140 may include a single ply or multiple plies of reinforcement materials.

In the illustrated embodiment, the barrier layer 130 includes a thin layer of polymeric film configured to act as a barrier to prevent rubber from the inner tube 110 or any other intermediate rubber layer from reaching the outer cover 140 and/or protruding therethrough during curing of the hose 100. Alternatively, the barrier layer 130 can include a metal foil. Although the illustrated embodiment includes a single barrier layer, it will be appreciated that the hose 100 can include two or more barrier layers depending upon the particular fluid conveying application involved.

The polymeric film can be constructed, for example, of nylon, polyolefin, polyester, or combinations thereof; can have a thickness, for example, between about 0.0008 inches and about 0.015 inches; and can have a color, for example, that blends in or is "camouflaged" by the color of the reinforcement material used to form the outer cover 140. For example, if the outer cover 140 is constructed of braided stainless steel wire, then the color of the rubber layer can be silver, grey, white, clear, or any other shade thereof or any other color that blends in or is "camouflaged" by the color silver. It should also be appreciated that the softening point of the polymeric film should be sufficiently higher (e.g., about 10° C.) than the intended curing temperature of the hose 100 to prevent degradation of the polymeric film. The polymeric film may be a single layer film or a multi-layer label (e.g., a laminate film). One suitable example of a polymeric film that can be used to form the barrier layer 130 is a single layer nylon 6/6 film that has a thickness of 0.001 inches and is clear in color.

A method for producing the hose 100 described above and illustrated in FIG. 1 will now be described. It will be appreciated that the following method is only one example of a method to make the hose 100 and other methods are possible.

In one exemplary method, the inner tube 110 is first extruded onto a flexible mandrel (not shown) as is known in the art of hose making. The reinforcement layer 120 is then applied over the inner tube 110 by partially or fully braiding, spiral winding, knitting, or wrapping the reinforcement material over the inner tube 110. Next, the barrier layer 130 is applied over the reinforcement layer 120 by spiral wrapping, longitudinal wrapping, or extruding the polymeric film over the reinforcement layer 120. The outer cover 140 is then applied over the barrier layer 130 by braiding or knitting the reinforcement material over the barrier layer 130. After the hose 100 has been constructed, the hose 100 is heated to a temperature of at least about 120° C., and more particularly 140° C. to 170° C., to cure the rubber based components of the hose 100 and to create adhesion between each layer of the hose 100.

Figure 2:
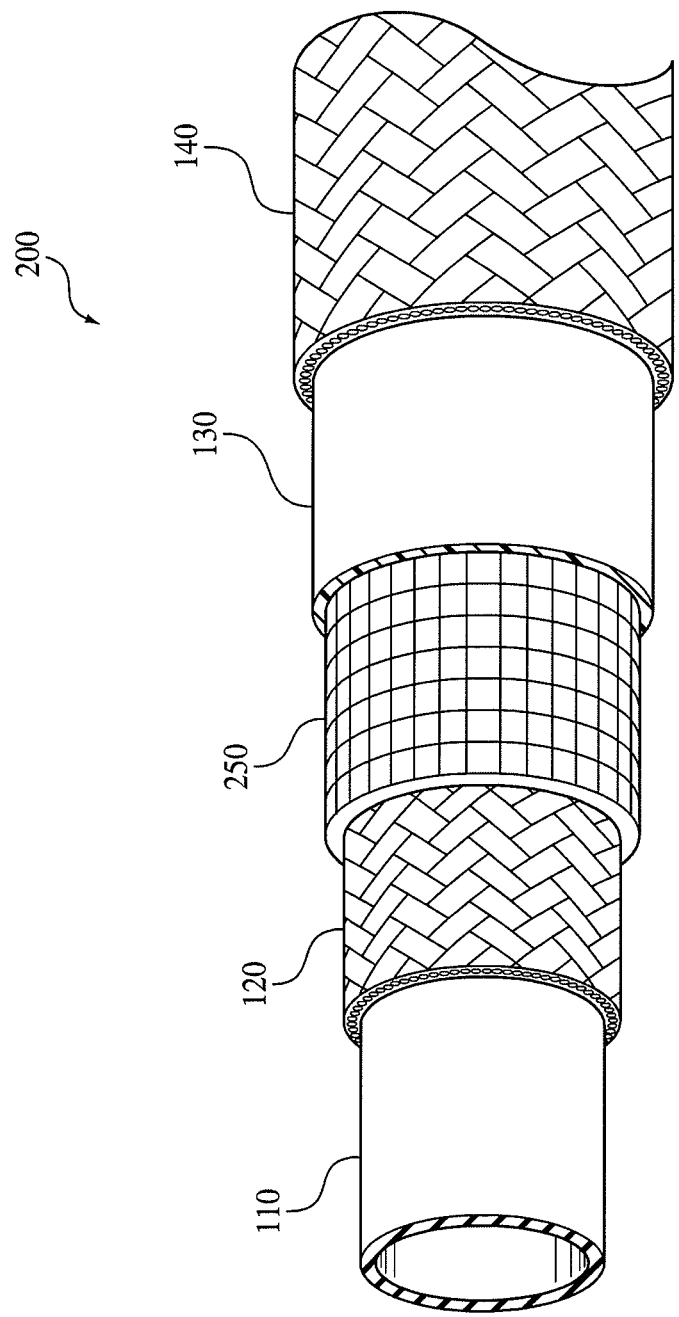
FIG. 2 illustrates a perspective view, partly cut away, of another embodiment of a hose 200.

Illustrated in FIG. 2 is a perspective view, partly cut away, of another embodiment of a hose 200 for conveying a fluid. The hose 200 is similar to the hose 100 described above and illustrated in FIG. 1, with the exception that it includes an intermediate layer 250 disposed between the reinforcement layer 120 and the barrier layer 130. Although the illustrated embodiment includes a single intermediate layer, it will be appreciated that the hose 200 can include two or more intermediate layers depending upon the particular fluid conveying application involved.

In the illustrated embodiment, the intermediate layer 250 includes a porous material that provides gaps and spaces between the reinforcement layer 120 and the barrier layer 130 into which rubber from the inner tube 110 or any other intermediate rubber layer can flow during curing of the hose 200. The porous material can also assist in interlocking the inner tube 110 to the reinforcement layer 120. By providing gaps and spaces into which rubber can flow during curing of the hose 200, the pressure of the expanding rubber on the barrier layer 130 during curing of the hose 200 is reduced. This reduction in rubber flow pressure reduces the amount of or prevents the rubber from reaching the outer cover 140 and protruding therethrough.

Porous material that can be used to form the intermediate layer 250 can include, for example, an open mesh material such as a woven fabric, knitted fabric, or spun-bonded fabric; wire mesh screen; braided or knitted material; or any other porous material that has gaps or spaces that permit rubber to flow therein. The porous material can be constructed of a metal or polymeric material and can have a thickness, for example, between about 0.001 inches and about 0.020 inches. One suitable example of a porous material that can be used to form the intermediate layer 250 is a knitted polyester fabric having a thickness of 0.010 inches and 18-24 openings/inch.

A method for producing the hose 200 described above and illustrated in FIG. 2 will now be described. It will be appreciated that the following method is only one example of a method to make the hose 200 and other methods are possible.

In one exemplary method, the inner tube 110 is first extruded onto a flexible mandrel (not shown) as is known in the art of hose making. The reinforcement layer 120 is then applied over the inner tube 110 by partially or fully braiding, spiral winding, knitting, or wrapping the reinforcement material over the inner tube 110. Next, the intermediate layer 250 is applied over the reinforcement layer 120 by spiral winding, knitting, or wrapping the porous material over the reinforcement layer 120. In one specific example, the intermediate layer 250 can be spirally wrapped over the reinforcement layer 120 with a 50% overlap to provide a two-thickness layer. The barrier layer 130 is then applied over the intermediate layer 250 by spiral wrapping, longitudinal wrapping, or extruding the polymeric film over the intermediate layer 250. Next, the outer cover 140 is applied over the barrier layer 130 by braiding or knitting the reinforcement material over the barrier layer 130. The hose 200 is then cured similar to the process discussed above with respect to the hose 100.

Figure 3:
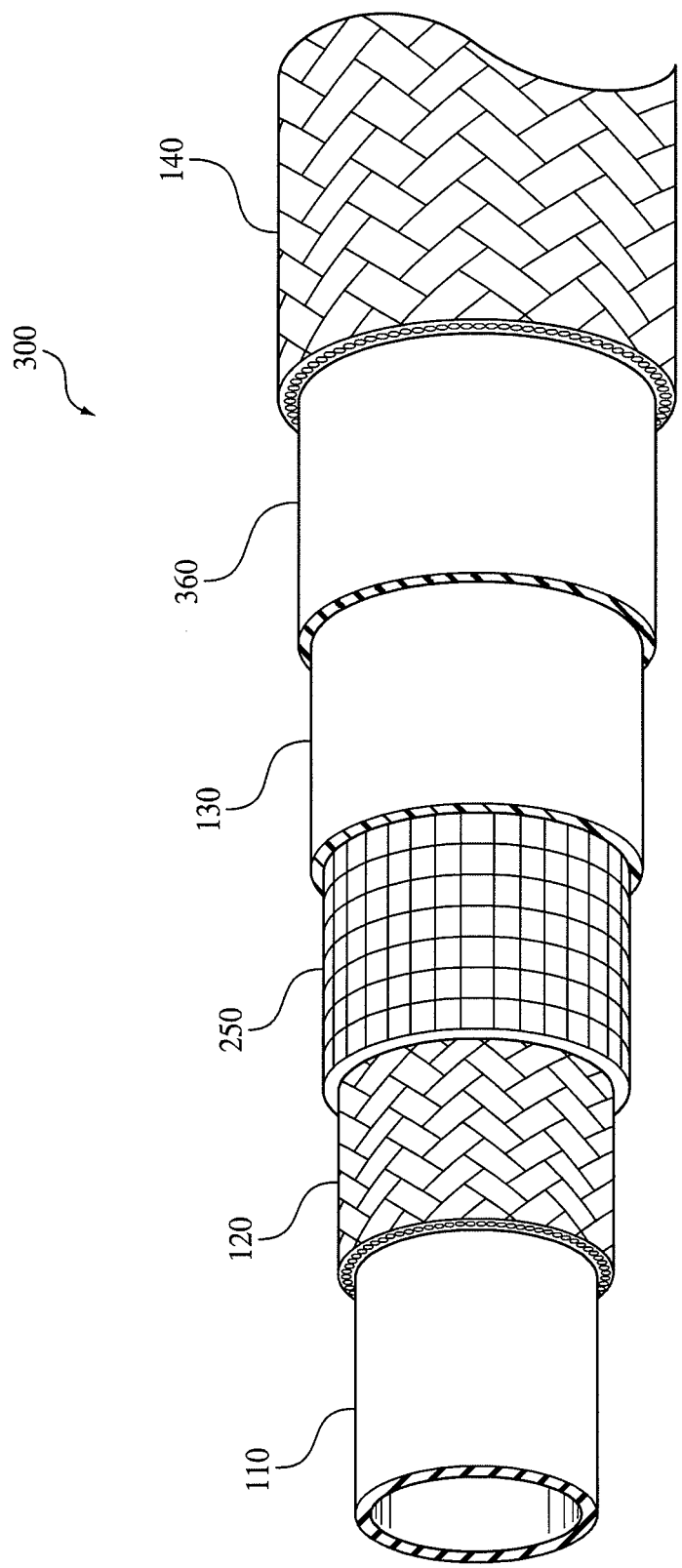
FIG. 3 illustrates a perspective view, partly cut away, of another embodiment of a hose 300.

Illustrated in FIG. 3 is a perspective view, partly cut away, of another embodiment of a hose 300 for conveying a fluid. The hose 300 is similar to the hose 200 described above and illustrated in FIG. 2, with the exception that it includes a retaining layer 360 disposed between the barrier layer 130 and the outer cover 140. Although the illustrated embodiment includes a single retaining layer, it will be appreciated that the hose 300 can include two or more retaining layers depending upon the particular fluid conveying application involved.

The retaining layer 360 can be constructed of, for example, any elastomeric material or other polymeric material that has a softening point at or below the intended curing temperature of the hose 300. The retaining layer 360 also can have a thickness, for example, between about 0.001 inches and about 0.010 inches and can have a color that blends in or is "camouflaged" by the color of the reinforcement material used to form the outer cover 140. For example, if the outer cover 140 is constructed of braided stainless steel wire, then the color of the retaining layer material can be silver, grey, white, clear, or any other shade thereof or any other color that blends in or is "camouflaged" by the color silver. One suitable example of a material that can be used to form the retaining layer 360 is an acrylonitrite-butadiene rubber (NBR)/polyvinylchloride (PVC) blend that has a thickness of about 0.003 inches and is white in color.

The retaining layer 360 is employed in the hose 300 to provide a mechanical interlock with the outer cover 140 during curing of the hose 300, due to the fact that some of the material from the retaining layer 360 will flow into the small gaps in the outer cover 140. This mechanical interlock between the retaining layer 360 and the outer cover 140 will prevent the outer cover 140 from moving relative to the rest of the hose 300. It will be appreciated that because the retaining layer 360 is relatively thin, the material should not flow through the outer cover 140 enough to be visible from the outside. In the event that this material does flow through the outer cover 140, the material will not be noticeable since they are of a color that blends in or is "camouflaged" by the color of the reinforcement material used to form the outer cover 140.

In alternative embodiments, the retaining layer 360 can be replaced with a thin adhesive layer that is configured to adhere to the reinforcement material used to form the outer cover 140 as well as the polymeric film used to form the barrier layer 130. The adhesive can be curable, for example, by heat activation, moisture, or ultraviolet (UV) light.

A method for producing the hose 300 described above and illustrated in FIG. 3 will now be described. It will be appreciated that the following method is only one example of a method to make the hose 300 and other methods are possible.

In one exemplary method, the inner tube 110 is first extruded onto a flexible mandrel (not shown) as is known in the art of hose making. The reinforcement layer 120 is then applied over the inner tube 110 by partially or fully braiding, spiral winding, knitting, or wrapping the reinforcement material over the inner tube 110. Next, the intermediate layer 250 is applied over the reinforcement layer 120 by spiral winding, knitting, or wrapping the porous material over the reinforcement layer 120. In one specific example, the intermediate layer 250 can be spirally wrapped over the reinforcement layer 120 with a 50% overlap to provide a two-thickness layer. The barrier layer 130 is then applied over the intermediate layer 250 by spiral wrapping, longitudinal wrapping, or extruding the polymeric film material over the intermediate layer 250. Next, the retaining layer 360 is applied over the barrier layer 130 by spiral wrapping, longitudinal wrapping, or extruding the elastomeric or other polymeric material over the barrier layer 130. If adhesive is being used instead of the elastomeric material or other polymeric material, the adhesive can be applied over the barrier layer 130 by melt extruding, solution coating, spraying, dipping, or any other known adhesive applying process. The outer cover 140 is then applied over the barrier layer 130 by braiding or knitting the reinforcement material over the barrier layer 130. Next, the hose 300 is cured similar to the process discussed above with respect to the hose 100.

Figure 4:
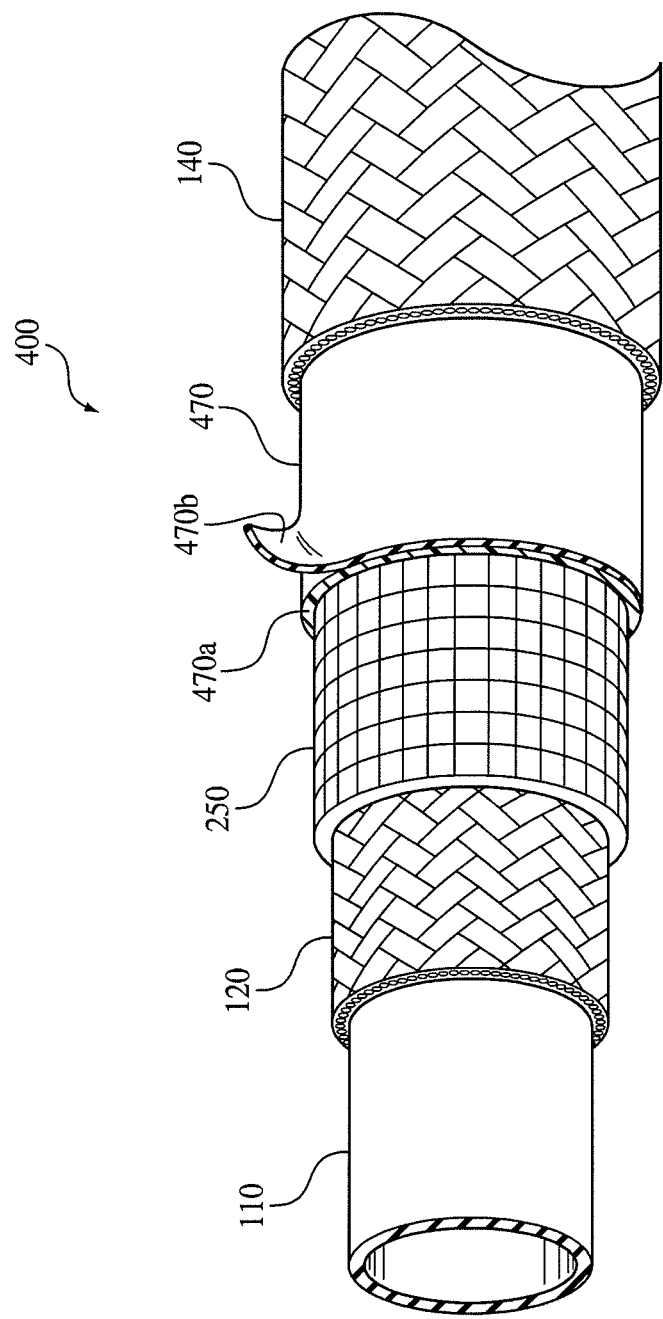
FIG. 4 illustrates a perspective view, partly cut away, of another embodiment of a hose 400.

Illustrated in FIG. 4 is a perspective view, partly cut away, of another embodiment of a hose 400 for conveying a fluid. The hose 400 is similar to the hose 300 described above and illustrated in FIG. 3, with the exception that it includes a composite barrier/retaining layer 470 that replaces the separate barrier and retaining layers 130, 360. Specifically, the composite barrier/retaining layer 470 includes a composite structure having a barrier sub-layer 470a and a retaining sub-layer 470b.

In one embodiment, the barrier sub-layer 470a is made from a polymeric film similar to the polymeric film used in the barrier layer 130 discussed above, such as the single layer nylon 6/6 film that has a thickness of 0.001 inches and is clear in color. In one embodiment, the retaining sub-layer 470b is made from an elastomeric or other polymeric material similar to the material used in the retaining layer 360 discussed above, such as an NBR/PVC blend that has a thickness of 0.003 inches and is white in color. Like the retaining layer 360 discussed above, the retaining sub-layer 470b can be replaced with an adhesive coated on the barrier sub-layer 470a that is similar to the adhesive discussed above. The composite barrier/retaining layer 470 can be made using a co-extrusion process or the retaining sub-layer 470b can be coated on the barrier sub-layer 470a using any conventional coating process.

As shown in FIG. 4, the composite barrier/retaining layer 470 is oriented such that the barrier sub-layer 470a faces the intermediate layer 250 and the retaining sub-layer 470b faces the outer cover 140. In an alternative embodiment (not shown), the composite barrier/retaining layer 470 can include an additional retaining sub-layer coated on the other side of the polymeric film sub-layer 470a to assist in manufacturing (i.e., to prevent the composite film from being applied upside down).

It will be appreciated that the composite barrier/retaining layer 470 functions in a similar manner as the separate barrier and retaining layers 130, 360 employed in the hose 300. For example, the barrier sub-layer 470a of the composite barrier/retaining layer 470 acts as a barrier to prevent rubber from the inner tube 110 or any other intermediate rubber layer from reaching the outer cover 140 and/or protruding therethrough during curing of the hose 400. Additionally, the retaining sub-layer 470b of the composite barrier/retaining layer 470 forms a mechanical interlock with the outer cover 140 during curing of the hose 300, thereby preventing the outer cover 140 from moving relative to the rest of the hose 400. If the retaining sub-layer 470b is replaced with an adhesive sub-layer, the adhesive sub-layer adheres to the outer cover 140 to prevent relative movement between the outer cover 140 and the rest of the hose 400.

A method for producing the hose 400 described above and illustrated in FIG. 4 will now be described. It will be appreciated that the following method is only one example of a method to make the hose 400 and other methods are possible.

In one exemplary method, the inner tube 110 is first extruded onto a flexible mandrel (not shown) as is known in the art of hose making. The reinforcement layer 120 is then applied over the inner tube 110 by partially or fully braiding, spiral winding, knitting, or wrapping the reinforcement material over the inner tube 110. Next, the intermediate layer 250 is applied over the reinforcement layer 120 by spiral winding, knitting, or wrapping the porous material over the reinforcement layer 120. In one specific example, the intermediate layer 250 can be spirally wrapped over the reinforcement layer 120 with a 50% overlap to provide a two-thickness layer. The composite barrier/retaining layer 470 is then applied over the intermediate layer 250 by spiral wrapping, longitudinal wrapping, or extruding the composite structure over the intermediate layer 250. The outer cover 140 is then applied over the barrier layer 130 by braiding or knitting the reinforcement material over the barrier layer 130. Next, the hose 400 is cured similar to the process discussed above with respect to the hose 100.

Among other features, one or more of the hoses described above and illustrated in the figures are constructed in a manner that reduces or prevents rubber "strike through." More particularly, the barrier layer employed in each of the hoses reduces or prevents rubber from flowing through to the outer cover. Additionally, the employment of an intermediate layer that includes a porous material provides gaps and spaces between the reinforcement layer and the barrier layer into which rubber can flow during curing of the hose. By providing gaps and spaces into which rubber from can flow during curing of the hose, the pressure of the expanding rubber on the barrier layer during curing of the hose is reduced. This reduction in rubber flow pressure reduces the amount of or prevents the rubber from reaching the outer cover and protruding therethrough. Moreover, the rubber layer, whether employed separate from the barrier layer or in combination with the barrier layer (i.e., the composite barrier/retaining layer), provides a mechanical interlock with the outer cover during curing of the hose, thereby preventing the outer cover from moving relative to the rest of the hose.

Although the embodiments described above and illustrated in the figures are primarily directed to hoses having an outer braided cover, it will be appreciated that this invention has applicability with other types of hoses. For example, the barrier layers, with or without the intermediate layer and/or the separate rubber layer, or the composite barrier/retaining layer, with or without the intermediate layer, can be used in hoses having a polymeric outer cover to reduce the amount of or prevent rubber from reaching the outer cover.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A hose comprising:
   at least one rubber layer;
   an outer cover;
   at least one barrier layer provided between the rubber layer and the outer cover, wherein the barrier layer is configured to prevent rubber from the rubber layer from reaching the outer cover during curing of the hose;
   at least one reinforcement layer provided between the rubber layer and the barrier layer; and
   at least one intermediate layer provided between the reinforcement layer and the barrier layer, wherein the intermediate layer includes a porous material configured to allow rubber to flow through from the rubber layer during curing of the hose.

2. The hose of claim 1, wherein the rubber layer is an inner tube through which fluid passes.

3. The hose of claim 1, wherein the outer cover includes a braided reinforcement material.

4. The hose of claim 3, wherein the braided reinforcement material includes braided stainless steel wire.

5. The hose of claim 1, wherein the barrier layer includes at least one layer of polymeric film having a softening point that is greater than the intended curing temperature of the hose.

6. The hose of claim 5, wherein the polymeric film is constructed of a material selected from the group consisting of nylon, polyester, polyolefin, and combinations thereof.

7. The hose of claim 1, wherein the porous material includes an open mesh material.

8. The hose of claim 1, further comprising at least one retaining layer provided between the barrier layer and the outer cover, the retaining layer configured to provide a mechanical interlock with the outer cover during curing of the hose.

9. The hose of claim 8, wherein the retaining layer includes an acrylonitrile-butadiene rubber/polyvinylchloride blend material.

10. The hose of claim 8, wherein the retaining layer includes an adhesive.

11. The hose of claim 7, wherein the open mesh material is a polymeric material.

12. A hose comprising:
    an inner tube of elastomeric material through which fluid passes;
    an outer braided cover;
    at least one composite barrier/retaining layer provided between the inner tube and the outer cover, wherein the barrier layer includes a barrier sub-layer and a retaining sub-layer; and
    at least one intermediate layer provided between the inner tube and the barrier layer, wherein the intermediate layer includes a porous material providing gaps through which the elastomeric material flows during curing.

13. The hose of claim 12, wherein the outer braided cover includes braided stainless steel wire.

14. The hose of claim 12, wherein the barrier layer includes at least one layer of polymeric film having a softening point that is greater than the intended curing temperature of the hose.

15. The hose of claim 14, wherein the polymeric film is constructed of a material selected from the group consisting of nylon, polyester, polyolefin, and combinations thereof.

16. The hose of claim 12, further comprising at least one reinforcement layer provided between the inner tube and the barrier layer.

17. The hose of claim 12, wherein the retaining sub-layer is configured to provide a mechanical interlock with the outer braided cover during curing of the hose.

18. The hose of claim 17, wherein the retaining sub-layer is constructed of a material that includes an acrylonitrile-butadiene rubber/polyvinylchloride blend.

19. The hose of claim 12, wherein the barrier sub-layer is positioned nearer the inner tube and the retaining sub-layer is positioned nearer the outer covering.

20. The hose of claim 19, wherein the barrier sub-layer is constructed of a material that includes nylon and the retaining sub-layer is constructed of a material that includes an acrylonitrile-butadiene rubber/polyvinylchloride blend.

21. A method of manufacturing a hose, the method comprising the steps of:

providing an inner tube of an elastomeric material;
applying at least one intermediate layer of porous material over the inner tube;
applying at least one composite barrier/retaining layer over the intermediate layer, wherein the barrier layer includes a barrier sub-layer and a retaining sub-layer;
applying an outer braided cover over the composite barrier/retaining layer; and
curing the inner tube, intermediate layer, composite barrier/retaining layer, and outer braided cover such that the elastomeric material flows through the porous material of the intermediate layer.

22. The method of claim 21, further comprising applying at least one reinforcing layer over the inner tube.

23. The method of claim 21, wherein the outer braided cover includes braided stainless steel wire.

24. The method of claim 21, wherein the porous material includes an open mesh material.

25. The method of claim 24, wherein the open mesh material is a polymeric material.

* * * * *